No. 777,599. PATENTED DEC. 13, 1904.
W. H. CHAPMAN.
APPARATUS FOR REMOVING STATIC ELECTRICITY FROM PAPER, &c.
APPLICATION FILED FEB. 8, 1904.
NO MODEL.
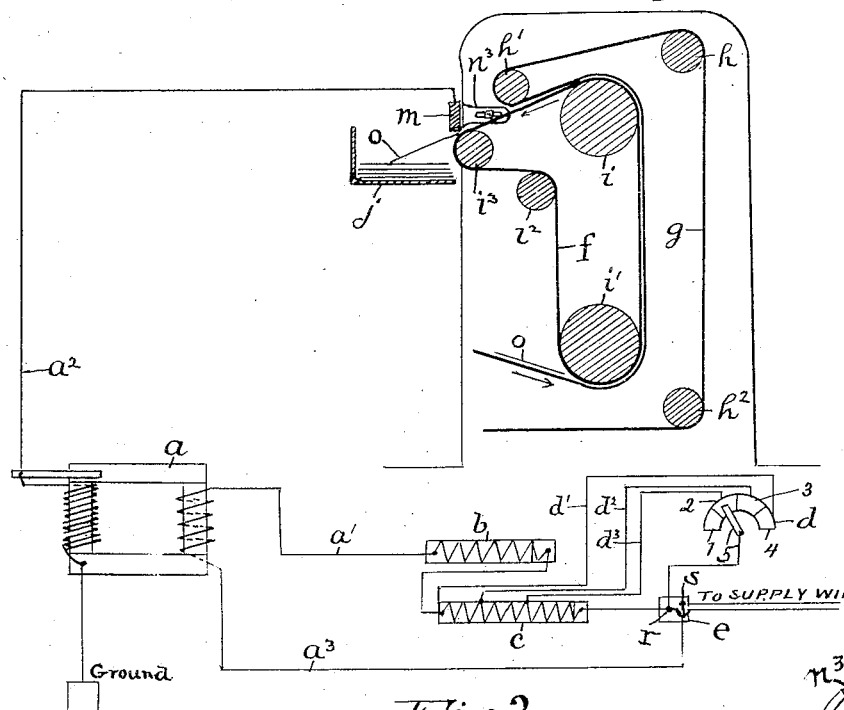
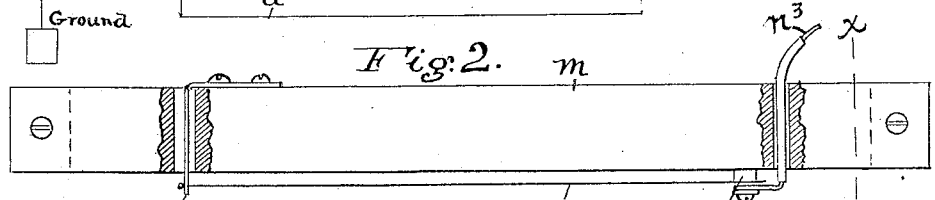
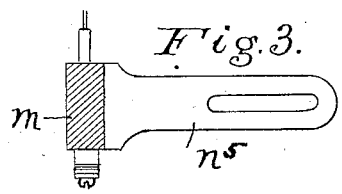
Witnesses:
O. E. Marshall
L. M. Godfrey
Inventor:
William H. Chapman
by S. W. Bates
his Atty.

No. 777,599.

Patented December 13, 1904.

UNITED STATES PATENT OFFICE.

WILLIAM H. CHAPMAN, OF PORTLAND, MAINE, ASSIGNOR TO THE PORTLAND COMPANY, OF PORTLAND, MAINE, A CORPORATION OF MAINE.

APPARATUS FOR REMOVING STATIC ELECTRICITY FROM PAPER, &c.

SPECIFICATION forming part of Letters Patent No. 777,599, dated December 13, 1904.

Application filed February 8, 1904. Serial No. 192,524. (No model.)

*To all whom it may concern:*

Be it known that I, WILLIAM H. CHAPMAN, a citizen of the United States of America, and a resident of Portland, Cumberland county, State of Maine, have invented certain new and useful Improvements in Apparatus for Removing Static Electricity from Paper, &c., of which the following is a specification.

My present invention relates to the neutralization of static charges of electricity in various substances by the application of charges of opposite polarity as these substances are passing through the ordinary industrial processes—as, for instance, paper passing through calenders or over printing-presses or being manufactured into paper bags.

The general principle on which my invention is based is stated in the law that like electric charges repel each other and unlike charges attract each other and tend to come together and produce a neutral condition. If one body having an electric charge is moved in proximity to another body having a charge of opposite polarity, the charge in the first body may be neutralized by receiving the proper quantity from the second body; but if the charge in the second body is all the time of one polarity it is a matter of fine regulation to make it deliver just enough to neutralize the other body, and therefore alternating charges are preferable for the purpose, because an alternate charge has successively different polarities, and I have made the discovery that a fixed electric charge in one body will draw forth from an adjacent body charged alternately with positive and negative the right kind and quantity to exactly neutralize itself and is, in other words, self-selective as to kind and quantity, and the passage of the necessary quantity across the intervening space is made easy either by high voltage or reduced surface of the body supplying the neutralizing charge or both these factors combined.

In practically carrying out my invention I provide apparatus that shall generate and distribute the proper electrical charges in a reliable and efficient manner. For this purpose I make use of an alternating-current transformer supplied with current either from a small alternator installed for the purpose or from an ordinary alternating-current lighting system, such as in common use in manufacturing establishments where my device would be used. The transformer is of special design, having a primary coil consisting of two or three hundred turns of coarse wire and a secondary consisting of forty thousand to sixty thousand turns of very fine wire—in fact, the finest wire that it is practicable to handle, (like No. 40.) When the voltage applied to the primary is one hundred and ten, the voltage in the secondary becomes by ratio of turns in the windings two hundred times as great, or about twenty-two thousand volts; but if the primary coil was connected directly to the one-hundred-and-ten-volt supply-wires of a lighting-circuit the transformer would be capable of giving dangerous shocks, and to avoid this condition I place a non-inductive resistance in series with the primary coil by which the current output of the secondary coil is limited and is safe to handle. If, for instance, the primary coil has two hundred turns of wire and the secondary has forty thousand turns and we place a non-inductive resistance of fifty-five ohms in series with the primary coil and with the one-hundred-and-ten-volt supply-circuit, the greatest quantity that can pass through the primary coil under any conditions, even assuming that the primary has no resistance, would be one hundred and ten volts divided by fifty-five ohms equal two amperes, and then by ratio of turns in the two coils we have $\frac{200}{40,000} \times 2 = .01$ ampere. The current in the secondary is thus limited to one one-hundredth part of an ampere, which is perfectly harmless, and this limitation of current is no detriment to the useful object of the transformer, because of the fact that the charges on such substances as paper, while having a pressure of thousands of volts, are of such an exceedingly small quantity that the current required to neutralize them cannot even be measured in terms of thousandths of an ampere, and while the voltage capacity of the transformer may need to be from five thousand to twenty thousand volts its current capacity need not exceed one one-hundredth ampere for the severest work found in any of the industrial processes before referred to.

I illustrate my invention by means of the accompanying drawings, in which—

Figure 1 is a diagrammatic view of the delivering end of a paper-bag machine with the electrical apparatus necessary to charge the conductor. Fig. 2 is a side view of the bar used for supporting the wire, and Fig. 3 is a cross-section on said bar at $x$ $x$ of Fig. 2.

Referring to Fig. 1, $f$ represents an endless belt running over pulleys $i$, $i'$, $i^2$, and $i^3$, and $g$ is the delivering-belt on which the paper bags $o$ are brought to the belt $f$. The belt $g$ runs over pulleys $i'$ and $i$ and pulleys $h'$, $h$, and $h^2$, bringing the bags to a delivering-box $j$, where they are stacked up. The bags leave the belt $f$ when it passes around the pulley $i^3$, and it is at this point that I prefer to place the conductor for neutralizing the electricity of the paper bags. The delivery portion of the paper-bag machines is old and well known and forms no portion of my invention and requires no further illustration for the understanding of my invention. Extending across the machine from one side to the other at the point where the bags are delivered is a conductor, preferably in the form of a fine wire, which is placed parallel with and a short distance away from the surface of the paper bags as they are delivered from the belt. This bar may be placed so that the wire is only one-half inch or less from the surface of the material to be operated upon, or it may be placed at a distance of several inches and still perform its function; but in case the number of alternations is very low I have found that some attention must be given to the relation of distance of the wire to voltage and to speed of the material under treatment, better results being obtained by placing the wire at a distance of an inch or two and using higher voltage, as the influence is then distributed a greater distance each side of the wire on the surface of the material under treatment. As here shown, the wire $n$ is supported on a rod $m$, which is preferably of wood, one end of the wire being secured by a screw and washer $n'$, which also secures the end of the feed-wire $n^3$. The opposite end of the wire is connected to the end of a spring for the purpose of keeping it straight at all times. As here shown, the spring consists of a metal angle-piece $n^2$, the limb to which the wire is secured extending through an opening in the rod, the other limb being secured to the back side of the rod by screws. The wire is thus drawn taut parallel with the surface of the rod and a short distance therefrom. To the ends of the rod are secured brackets $n^5$, by means of which the rod is secured to the frame of the machine. For the purpose of supplying to the wire an alternating current of high voltage I make use of a transformer $a$, connected with the wire by the wire $a^2$. The primary coil of the transformer is connected with a suitable source of supply, by which an alternating current is obtained, and this connection is made through a non-inductive resistance, so arranged that a portion may be cut out to regulate the quantity of current. As here shown, the primary coil of the transformer is connected by a line $a'$ with the resistance-coil $b$, which in turn connects in series with a coil $c$, so arranged that a whole or a portion may be short-circuited by means of a suitable switch. As here shown, one of the two line-terminals, $s$, connects with the primary circuit of the transformer, and the other one, $r$, connects with the lever 5 of a switch $d$, containing four segments 1, 2, 3, and 4. Segment 4 connects with the extreme end of the coil $c$ and is designed to cut out the entire coil, and segments 3 and 2 cut out less amounts connecting with points between the ends. Segment 1 is an idle segment, so that when the lever rests on it the current passes direct from the terminal $r$ through the entire coil $c$ through a wire connecting $r$ with the end of the coil. When the lever is turned to segment 2, a portion of the coil is short-circuited, and when it is turned to segments 3 and 4 still more of the coil is short-circuited. Thus by moving the arm 5 more or less current is passed through the primary circuit of the transformer; but the resistance-coil $b$ is always in and cannot be cut out, and this resistance is sufficiently great to prevent a dangerous amount of current from passing at any time. The alternating current is thus transformed to a high voltage, and this transmitted through the wire neutralizes the static electricity of the paper bags, which automatically selects and becomes neutralized by the charge of opposite polarity in the alternating charge.

Instead of the transformer above described I have in some cases made use of an induction-coil of the ordinary kind having a vibrator with excellent results, and this is a very convenient way of obtaining the alterations of voltage where a battery is the only available source of current.

It is evident that various modifications may be made in this apparatus while still keeping within the spirit of the invention.

I claim—

1. The herein-described apparatus for neutralizing charges of static electricity in moving paper or other like substances, consisting of a wire stretched adjacent to the moving face of the material and means for applying an alternating charge of electricity to said wire.

2. The herein-described apparatus for neutralizing charges of static electricity in moving paper or other like substance, consisting of a wire stretched adjacent to the moving face of the material and means for applying to the wire an alternating charge of electricity of high voltage.

3. The herein-described apparatus for neutralizing charges of static electricity in moving paper or other like substance, consisting of a conductor stretched adjacent to the surface of the moving material and a transformer connected with said conductor and means for supplying an alternating current to said transformer.

4. The herein-described apparatus for neutralizing charges of static electricity in moving paper or other like substance consisting of a conductor stretched adjacent to the surface of the moving substance, a transformer connected with said conductor and a resistance-coil in the primary circuit of the transformer and means for supplying an alternating current.

5. The herein-described apparatus for neutralizing charges of static electricity in moving paper or other like substance, consisting of a conductor stretched adjacent to the surface of the moving substance, a transformer connected with said conductor, a resistance in the primary circuit of said transformer, means for varying the said resistance and means for supplying an alternating current.

6. The herein-described apparatus for neutralizing charges of static electricity in machines handling paper or other like substance, consisting of a wooden bar adapted to be secured to the machine adjacent to the moving paper, a wire stretched parallel to the surface of said bar and means for applying to said wire an electric current.

7. The herein-described apparatus for neutralizing charges of static electricity in machines handling moving paper or other like substance consisting of a wooden bar, a spring on one end of said bar, a wire secured to said spring, a connection at the opposite end of said bar to which said wire is attached and means for applying an electric current to said wire.

Signed at Portland, Maine, this 2d day of February, 1904.

WILLIAM H. CHAPMAN.

Witnesses:
S. W. BATES,
L. M. GODFREY.